United States Patent
Reichard et al.

(10) Patent No.: US 7,460,917 B1
(45) Date of Patent: Dec. 2, 2008

(54) SYSTEM AND METHOD FOR IDENTIFYING MANUFACTURING DATA DEVIATIONS

(75) Inventors: Douglas J. Reichard, Fairview, OH (US); Clifton H. Bromley, New Westminster (CA); Eric G. Dorgelo, Port Moody (CA); Kevin G. Gordon, Annacis Island Delta (CA); Marc D. Semkow, Burnaby (CA); Shafin A. Virji, Vancouver (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 441 days.

(21) Appl. No.: 11/240,865

(22) Filed: Sep. 30, 2005

(51) Int. Cl.
*G05B 13/02* (2006.01)

(52) U.S. Cl. .............. 700/47; 700/33; 706/904
(58) Field of Classification Search ............. 700/47, 700/33, 174; 702/182; 706/904, 912
See application file for complete search history.

(56) References Cited

U.S. PATENT DOCUMENTS

| | | | |
|---|---|---|---|
| 4,722,830 A | 2/1988 | Urie et al. | |
| 6,203,701 B1 * | 3/2001 | Pressley et al. | 210/609 |
| 6,204,861 B1 | 3/2001 | Chen | |
| 6,298,377 B1 | 10/2001 | Hartikainen et al. | |
| 6,363,332 B1 * | 3/2002 | Rangarajan et al. | 702/182 |
| 6,366,927 B1 | 4/2002 | Meek et al. | |
| 6,587,747 B2 | 7/2003 | Hirai et al. | |
| 6,693,646 B1 | 2/2004 | Jones | |
| 6,757,619 B2 | 6/2004 | Zison et al. | |
| 6,952,657 B2 | 10/2005 | Jahns et al. | |
| 2003/0083756 A1 | 5/2003 | Hsiung et al. | |
| 2003/0090374 A1 * | 5/2003 | Quigley | 340/506 |
| 2003/0120444 A1 | 6/2003 | Zison et al. | |
| 2003/0144746 A1 | 7/2003 | Hsiung et al. | |
| 2003/0193522 A1 * | 10/2003 | Chandhoke | 345/764 |
| 2004/0186603 A1 | 9/2004 | Sanford et al. | |
| 2005/0000331 A1 * | 1/2005 | Farrell et al. | 83/13 |
| 2006/0089742 A1 * | 4/2006 | Jalluri et al. | 700/174 |

* cited by examiner

*Primary Examiner*—Albert DeCady
*Assistant Examiner*—Steven R Garland
(74) *Attorney, Agent, or Firm*—Amin Turocy & Calvin LLP; Alexander R. Kuszewski

(57) ABSTRACT

Systems and methods of industrial control processes that employ a data matching component associated with a programming logic controller (PLC), to substitute a plurality of collected data points with a data pattern (e.g., a curve). Such data matching component can facilitate data trending analysis, wherein a running industrial process can be compared with a predetermined criteria (industrial process with optimal/desired performance). A graphical tool (e.g., an on-screen) can be provided as part of the matching component, to enable a user to interactively set deviation thresholds from a predetermined criteria (e.g., optimum performance of an industrial operation.)

15 Claims, 8 Drawing Sheets

SYSTEM AND METHOD FOR IDENTIFYING MANUFACTURING DATA DEVIATIONS

BACKGROUND

Industrial controllers are special purpose processing devices used for controlling industrial processes, machines, manufacturing equipment, and other factory automation applications. In accordance with a control program or routine, an industrial controller may measure one or more process variables or inputs representative of the status of a controlled process, and change outputs effecting control of the process. The inputs and outputs may be binary, (e.g., on or off), and/or analog assuming a continuous range of values. The control routine may be executed in a series of execution cycles with batch processing capabilities, and may comprise one or more functional units. The measured inputs received from a controlled process and the outputs transmitted to the process may pass through one or more input/output (I/O) modules in a control system, which serve as an electrical interface between the controller and the controlled process, and may be located proximate or remote from the controller. The inputs and outputs may be recorded in an I/O table in processor memory. Input values may be asynchronously read from the controlled process by one or more input modules and output values may be written directly to the I/O table by a processor for subsequent communication to the process by specialized communications circuitry. An output module may interface directly with a controlled process, by providing an output from an I/O table to an actuator such as a motor, valve, solenoid, and the like.

During execution of the control routine, values of the inputs and outputs exchanged with the controlled process pass through the I/O table. The values of inputs in the I/O table may be asynchronously updated from the controlled process by dedicated scanning circuitry. This scanning circuitry may communicate with input and/or output modules over a bus on a backplane or network communications. The scanning circuitry may also asynchronously write values of the outputs in the I/O table to the controlled process. The output values from the I/O table may then be communicated to one or more output modules for interfacing with the process. Thus, a controller processor may simply access the I/O table rather than needing to communicate directly with the controlled process.

In distributed control systems, controller hardware configuration may be facilitated by separating the industrial controller into a number of control modules, each of which performs a different function. Particular control modules needed for the control task may then be connected together on a common backplane within a rack and/or through a network or other communications medium. The control modules may include processors, power supplies, network communication modules, and I/O modules exchanging input and output signals directly with the controlled process. Data may be exchanged between modules using a backplane communications bus, which may be serial or parallel, or via a network. In addition to performing I/O operations based solely on network communications, smart modules exist which may execute autonomous logical or other control programs or routines.

Various control modules of a distributed industrial control system may be spatially distributed along a common communication link in several racks. Certain I/O modules may thus be located proximate a portion of the control equipment, and away from the remainder of the controller. Data may be communicated with these remote modules over a common communication link, or network, wherein all modules on the network communicate via a standard communications protocol.

In a typical distributed control system, one or more I/O modules are provided for interfacing with a process. The outputs derive their control or output values in the form of a message from a master or peer device over a network or a backplane. For example, an output module may receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process. Input modules measure a value of a process variable and report the input values to a master or peer device over a network or backplane. The input values may be used by a processor (e.g., a PLC) for performing control computations.

In such processes, typically volume of data collected can require a significant amount of storage. Moreover, by examining such data, a user cannot readily determine dependencies between captured data and a relationship between such data and a predetermined desired or model process.

Therefore, there is a need to overcome the aforementioned exemplary deficiencies associated with conventional systems and devices.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods of industrial control processes that employ a data matching component associated with a programming logic controller (PLC), to substitute a plurality of collected data points with a data pattern (e.g., a curve). Such data matching component can facilitate data trending analysis, wherein an operating procedure/running process can be compared with a predetermined criteria (optimal/desired process). For example, a threshold deviation can be set to compare the operating procedure with a predetermined criteria of optimal performance. The data matching component can replace the collected data by a Bézier curve (B(t)), to facilitate storage and comparison of collected data with a predetermined value/criteria of an industrial process, and reduce storage space in memory, increase accuracy for recognizing deviations with an optimum operations, and the like. In general, the Bézier curve is a parametric curve, and for a cubic Bézier curve four points $P_0$, $P_1$, $P_2$ and $P_3$ in the plane or in three-dimensional space can define such a curve, for example. The curve can start at $P_0$ going toward $P_1$ and arrives at $P_3$ coming from the direction of $P_2$. Typically, such curve will not pass through $P_1$ or $P_2$; and such points exist to provide directional information. The distance between $P_0$ and $P_1$ determines "how long" the curve moves into direction $P_2$ before turning towards $P_3$; for example $$B(t)=P_0(1-t)^3+3P_1t(1-t)^2+3P_2t^2(1-t)+P_3t^3,\ t\epsilon[0,1].$$

In a related aspect, the data matching component can be operatively connected to a data collection component that is employed during data collection, for a controller (e.g., a programmable logic controller—PLC), for example. Moreover, computing a plurality of dependencies among data collected can be facilitated when employing curves, as opposed to discrete data points.

In a further aspect, a graphical tool (e.g., an on-screen) can be provided as part of the matching component, to enable a user to interactively set deviation thresholds from a predetermined criteria (e.g., optimum performance of an industrial operation). Such deviation threshold can in turn facilitate activation of a notification component (e.g., an audio herald) to signify whether the industrial process needs adjustments and is operating properly. The user can then change parameters that control the industrial process, to obtain desired performance and results. Such on-screen graphical tool can show the trend search parameters in a simple to understand graphical manner, so that the user can quickly and easily see on-screen, and manually set (e.g., using a workstation mouse), what data point of the collected data volume is to be used as the starting point for a trend search to identify faults in the industrial process.

According to a methodology of the subject innovation, a data collection component can initially gather data related to an industrial process associated with a PLC. Subsequently, the matching component can represent the collected data via a Bézier curve. Such Bézier curve can then be stored (instead of the individual collected data points), for control purposes. Various artificial intelligence components can also be employed in conjunction with various aspects of the subject innovation.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like, in addition to electro-mechanical components, can also refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Also, the word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Figure 1:
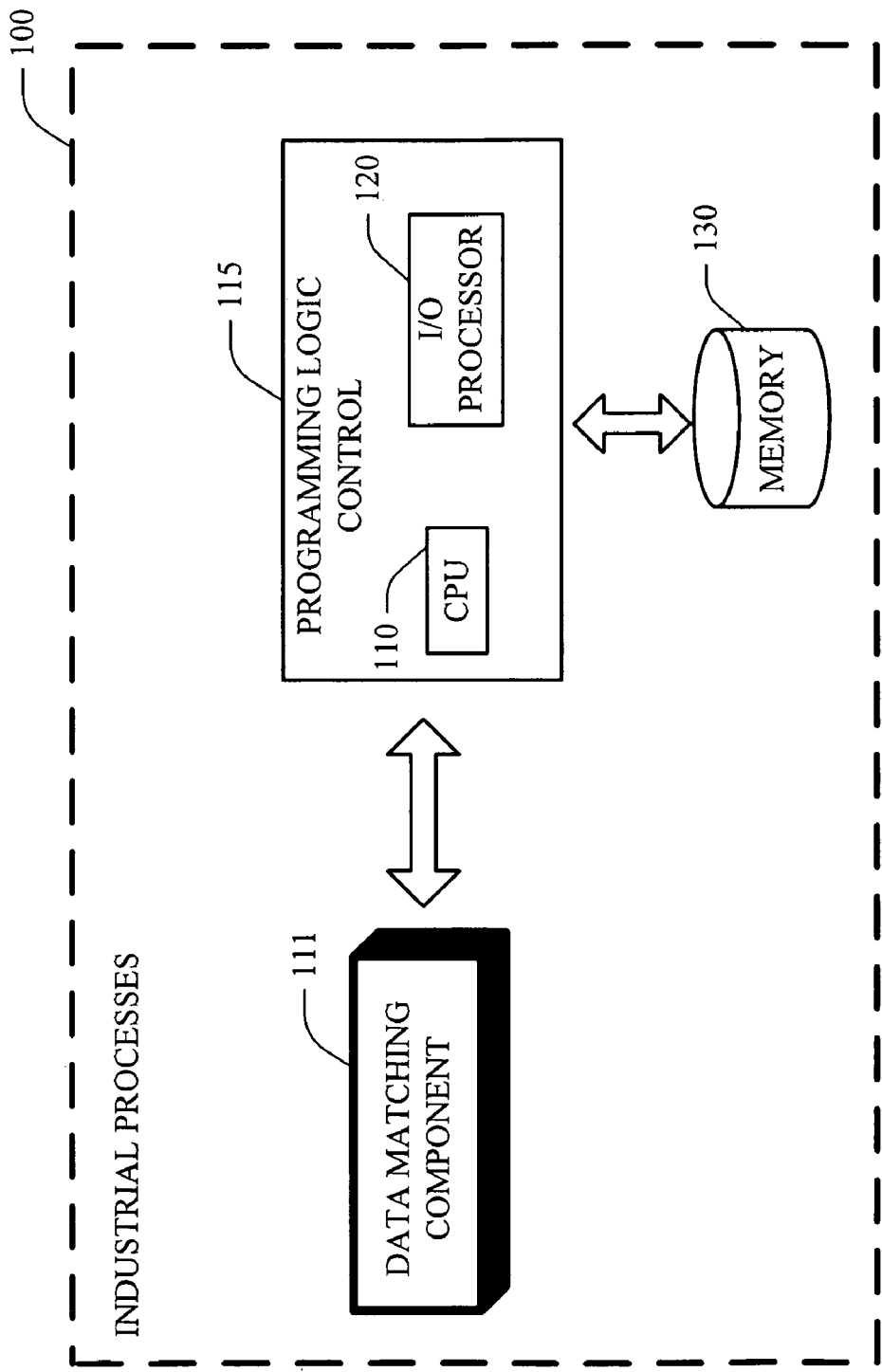
FIG. 1 illustrates a matching component that provides data curves associated with a programming logic controller, to facilitated data trending analysis.

Turning initially to FIG. 1, there is illustrated a data matching component 111. The data matching component 111 is operatively connected to a programming logic controller (PLC) 115, to substitute a plurality of collected data points with a data pattern (e.g., a curve). The PLC 115 can include a processor 110 and an I/O processor 120. For example, the processor 110 can be a central processing unit (CPU), control processor, logic processor and/or ladder processor for an industrial controller. The I/O processor 120 can generally be dedicated to performing I/O function(s) in a distributed control environment. The processor 110 and the I/O processor 120 are operatively coupled to shared memory 130 (e.g., RAM). For example, the processor 110 and the I/O processor 120 can be connected to the shared memory 130 through a backplane communications bus, which can be serial or parallel or via a network. The I/O processor 120 includes a cache memory (not shown). The shared memory 130 includes a virtual memory (not shown) which allows for memory management of the cache memory (e.g., a cacheable, read-only, mirrored image of the shared memory which can be addressed through a different address space.)

The data matching component 111 facilitates data trending analysis, wherein an operating procedure can be compared with a predetermined and/or desired industrial model for the industrial processes 100. A threshold deviation can be set to compare the operating procedure with a predetermined criteria of optimal performance. The operating procedure can for example relate to one or more class structures being defined to generically describe a grouping of components that can be applied to one or more recipes. Such components typically include materials that are listed or stored as members of a class. At run time of an automated industrial control process 100, a recipe is retrieved from a database, wherein the recipe contains the class structures, other materials, and associated logic for processing the recipe or batch. Before or during execution of the recipe or batch, class designations contained within the recipe are resolved for actual materials desired for employment with the recipe at hand. Data can be gathered at various points during the batch and mixing process, and the data matching component 111 can replace the collected data by a pattern (e.g., Bézier curve), to facilitate storage and comparison of collected data with a predetermined value/criteria of an industrial process. Such can reduce storage space in memory, increase accuracy for recognizing deviations with an optimum operations, and the like.

Figure 2:
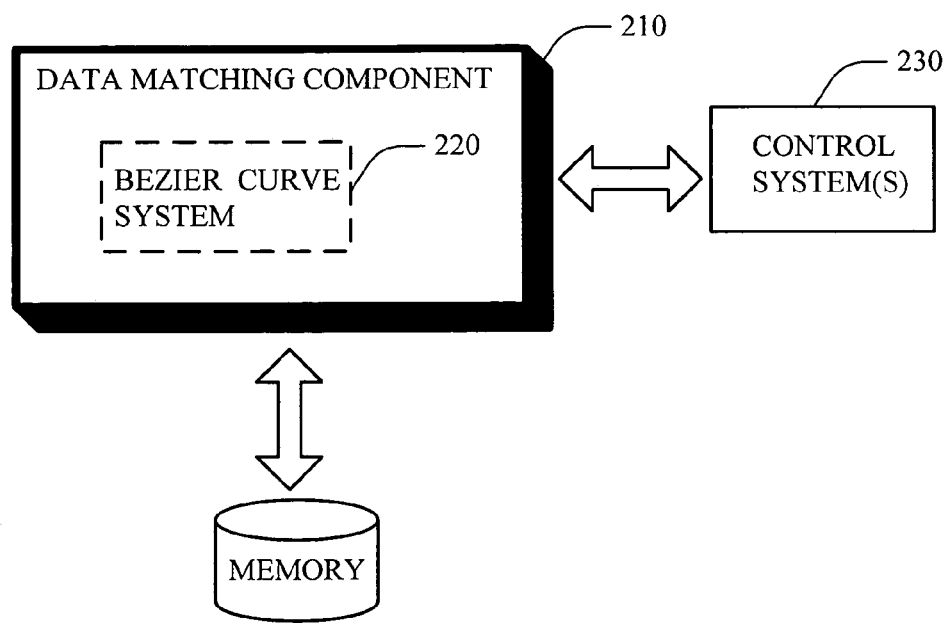
FIG. 2 illustrates a further matching component that implements a Bézier curve as part of replacing discrete data points with a pattern in accordance with an aspect of the subject innovation.

FIG. 2 illustrates another matching component 210 that implements a Bézier curve system 220 as part of replacing discrete data points with a pattern in accordance with an aspect of the subject innovation. The data matching component can be connected to a plurality of controllers 230. The control systems 230 can include various systems for processing the operations. Such systems include one or more controllers, one or more I/O modules (e.g., analog modules, digital modules, discrete AC and DC modules, Intelligent modules and so forth), communications modules and various equipment to implement the industrial process for which control is desired. The communications modules (not shown) facilitate control system communications across a network such as ControlNet, Device, Net, Ethernet, Internet, other factory/public networks and so forth. Such equipment can include substantially any component for processing materials such as machines, computers, vessels, mixers, loaders, agitators, valves, conduits, plumbing, and so forth in order to manufacture the recipe and associated materials.

It is to be appreciated that the associated network can includes access to public networks such as the Internet, Intranets, and automation networks such as Control and Information Protocol (CIP) networks including DeviceNet and ControlNet (can be adapted as multiple networks wherein factory networks are isolated from public networks). Other possible networks include Ethernet, TCP/IP, DH/DH+, Remote I/O, Fieldbus, Modbus, Profibus, wireless networks, serial protocols, and so forth. In addition, the control systems can include network components such as switches with virtual local area network (VLAN) capability, LANs, WANs, proxies, gateways, routers, firewalls, virtual private network (VPN) devices, other servers and/or clients, configuration tools, monitoring tools, and/or other devices.

The Bézier curve system 220 employs a Bezier curve, which is a mathematically described curves. Typically, a Bezier curve of order n is given by the parametric equation in u of:

$$P(u) = \sum_{i=0}^{n} P_i \frac{n!}{i!(n-i)!} u^i (1-u)^{n-i}$$

where: u is the parametric variable, u=0 yields the beginning point and u=1 yields the end point; n is the order of the Bezier curve; "i" is an index variable for the summation; and $P_i$ are control points for the Bezier curve. The Bezier curve intersects the first and last control points and has a shape determined by the intermediate control points and the order.

Figure 3:
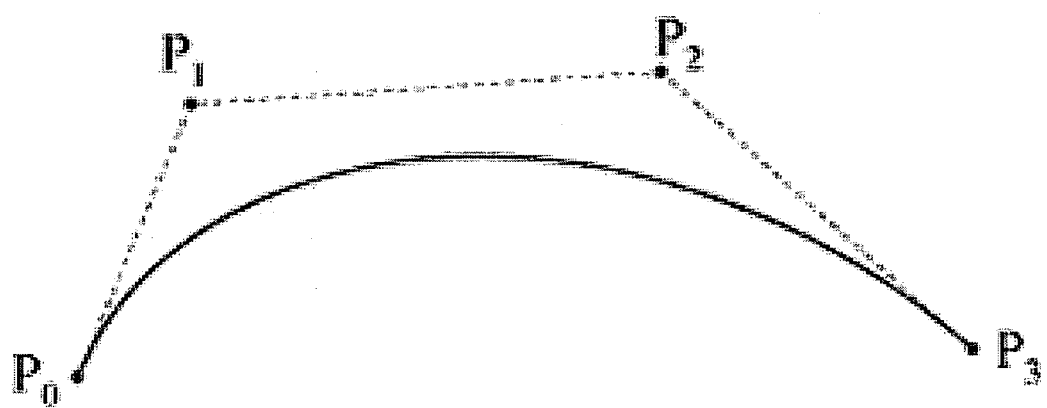
FIGS. 3 & 4 illustrate schematic illustrations of Bézier curves that can be implemented as part of the subject innovation.

Often computer generated Bezier curves can be limited to an order of 3. A Bezier curve of order 3 is given by the equation:

$$P(u) = P_o(1-u)^3 + P_1 3u(1-u)^2 + P_2 3u^2(1-u) + P_3 u^3$$

where: $P_0$, $P_1$, $P_2$, are the control points expressed in (x,y) coordinates. Bézier curves of order 3 are typically specified with 4 controlling points (FIG. 3). The first point $P_0$ and the fourth point $P_3$ define the respective beginning point and end point of the curve. The slope of the curve at the beginning point corresponds to the slope of the line segment joining the first point $P_0$ and the second point $P_1$. The slope at the end point corresponds to the slope of the line segment joining the third point $P_2$ and the fourth point $P_3$.

Computer programs can draw using curves defined via Bézier equations. For example, one known technique uses known mathematics to split the Bézier curve into two halves, each half also being a Bézier curve. Following splitting, each half is tested to determine if it is "approximately" straight. The method proceeds recursively splitting the curve into equal halves until the each half is "approximately" straight. These approximately straight sections are rendered as line segments.

The approximations produced by this recursive decomposition method are attractive, in that they are slightly asymmetric. This technique produces line segments in the order of the binary decomposition. Moreover, it is also possible to directly compute points on the Bezier curve from the definition equations. These calculations generally require floating point numbers due to the dynamic range of the quantities involved. Such direct calculation using floating point numbers can be performed using a floating point unit attached to the data processor. Furthermore, a Bezier curve may be smooth and streamlined, and it may also have very sharp turns and even fractures; it may have one or two bends, and even form loops. Additionally, the Bezier curve is also capable at approximating other types of curves. For example, while it is not possible to draw absolutely exact circle with Bezier curves, a user can approximate a quarter of a circle (e.g., a 90° arc) by a Bezier with an error of less than 0.06%, which is certainly negligible for most practical cases.

Figure 4:
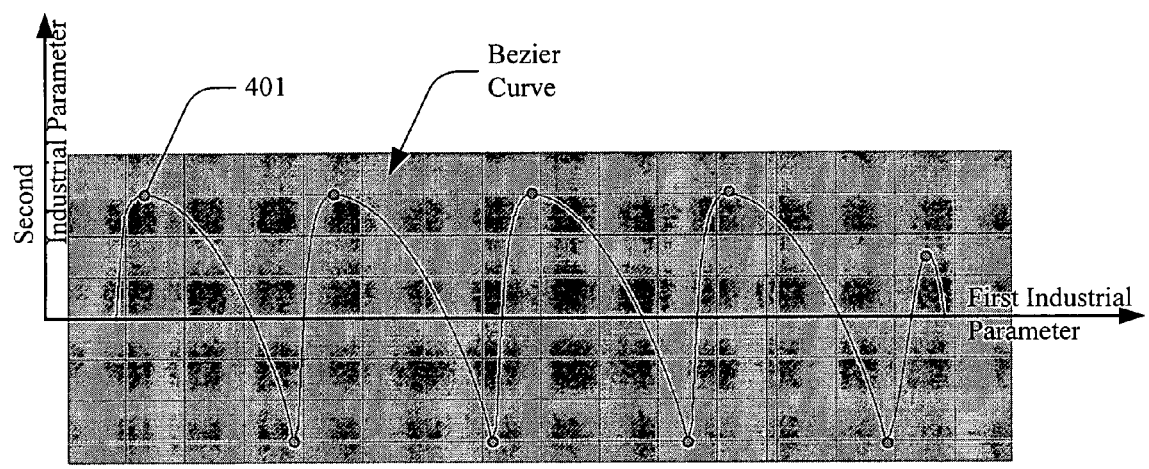

FIG. 3 illustrates a Bézier curve that initiates at $P_0$ and ends at $P_n$; (n being an integer, n=3 for example) this is the so-called endpoint interpolation property. Typically, if the control points lie on the curve, the curve is then transformed to a straight line. Moreover, the start (end) of the curve is tangent to the first (last) section of the Bézier polygon. A curve can be split at any point into two subcurves, or into a plurality of arbitrarily subcurves, each of which is also a Bézier curve. Likewise, FIG. 4 illustrates a Bézier curve that has replaced a plurality of discrete data points, and displays a representation of collected exemplary data. Such Bezier can be drawn to represent a dependency between a first industrial operation parameter on the x-axis (e.g., a motor speed, conveyor belt velocity, pump power, and the like), and a second industrial operation parameter on the y axis.

Each dot represents (e.g., 401) can also represent a parameter associated with a moment in time (e.g., the horizontal axis representing time), and the curve in between such moments represents the expected data that occurs in between. As such, the curve's mathematical formula can be employed to calculate and/or anticipate the in between data eliminating the need to store such in between data. The calculated data can further be employed to animate the data or compare the data to a running system. If the running data does not match the curve, the system could notify the users (e.g., via audio heralds) that a potential problem has occurred.

Figure 5:
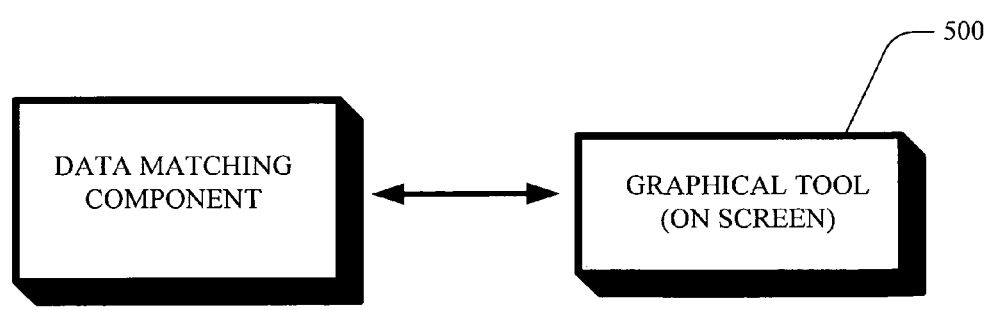
FIG. 5 illustrates a block diagram of an on-screen graphical tool as part of the matching component.

FIG. 5 illustrates a block diagram of an on-screen graphical tool that can be provided as part of the matching component. Such graphical tool 500 enables a user to interactively set deviation thresholds from a predetermined criteria (e.g., optimum performance of an industrial operation.) Such deviation threshold can in turn activate a notifying mechanism (e.g., an audio herald) to signify whether the industrial process needs adjustments and is operating properly. The user can then change parameters that control the industrial process, to obtain desired performance and results. Such on-screen graphical tool can show the trend search parameters in a simple to understand graphical manner. Accordingly, the user can quickly and easily observe variations on-screen, (and manually set using a workstation mouse), what data point of the collected data volume is to be used as the starting point for a trend search to identify faults in the industrial process.

Figure 6:
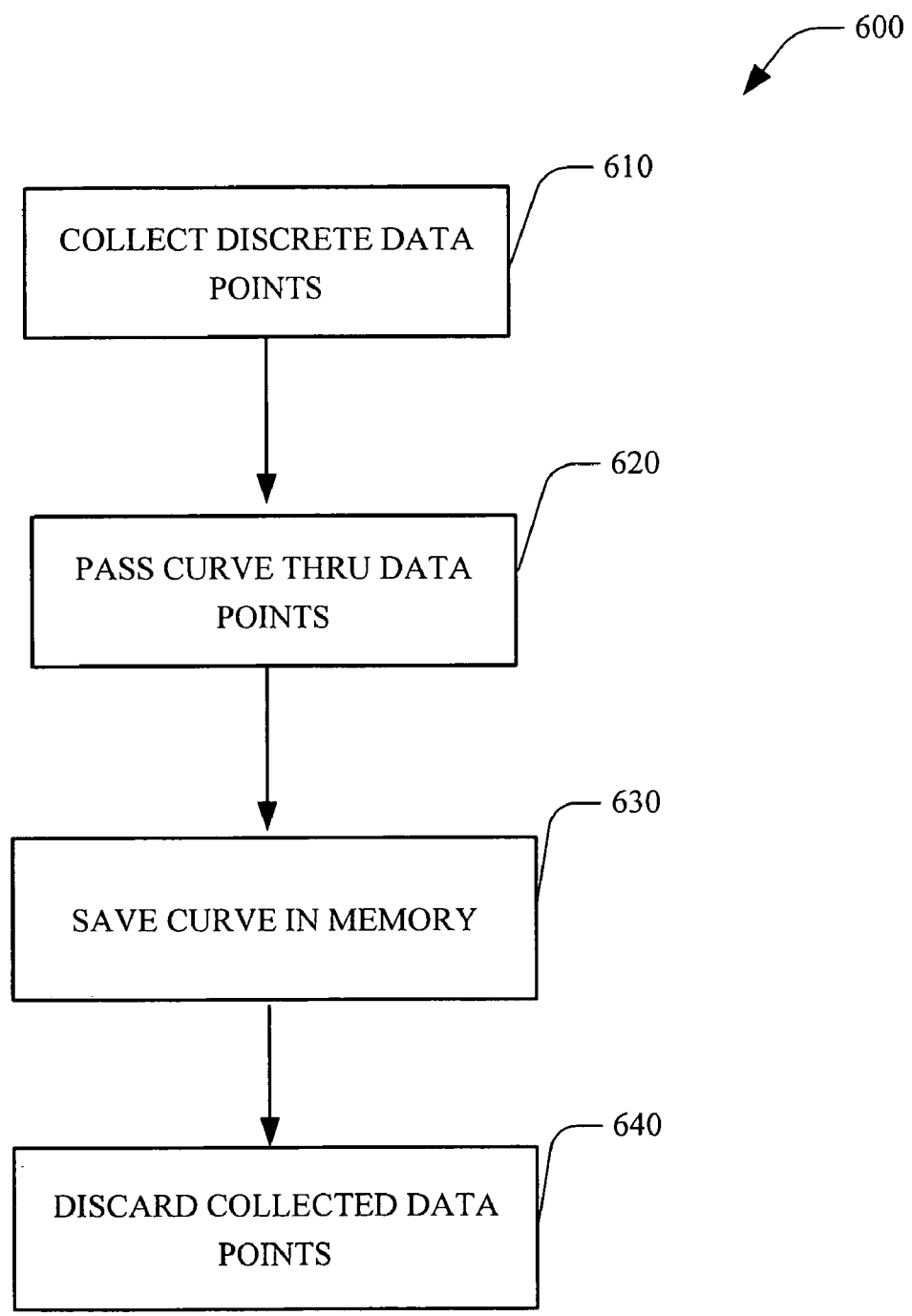
FIG. 6 illustrates a related methodology of identifying data deviation in accordance with an aspect of the subject innovation.

FIG. 6 illustrates a methodology 600 of data deviation and trending analysis in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 610, discrete data points are gathered via a data collection device, wherein the data points can relate to an operation of an industrial system that requires control, e.g., such data points can pertain to a speed of a conveyor belt, motor speed, and the like. At 620, the matching component can pass a curve thru such data points. For example, a Bézier curve can be employed for curve fitting thru the gathered point. Moreover, if a data point does not fit on such curve, a threshold can be specified and the point excluded if it falls out side of such threshold. At 630, the curve is saved in a memory associated with the matching component, and the collected points discarded at 640.

The subject innovation (e.g., in connection with supplying a pattern through collected data for the PLC) can employ various artificial intelligence based schemes for carrying out various aspects thereof. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
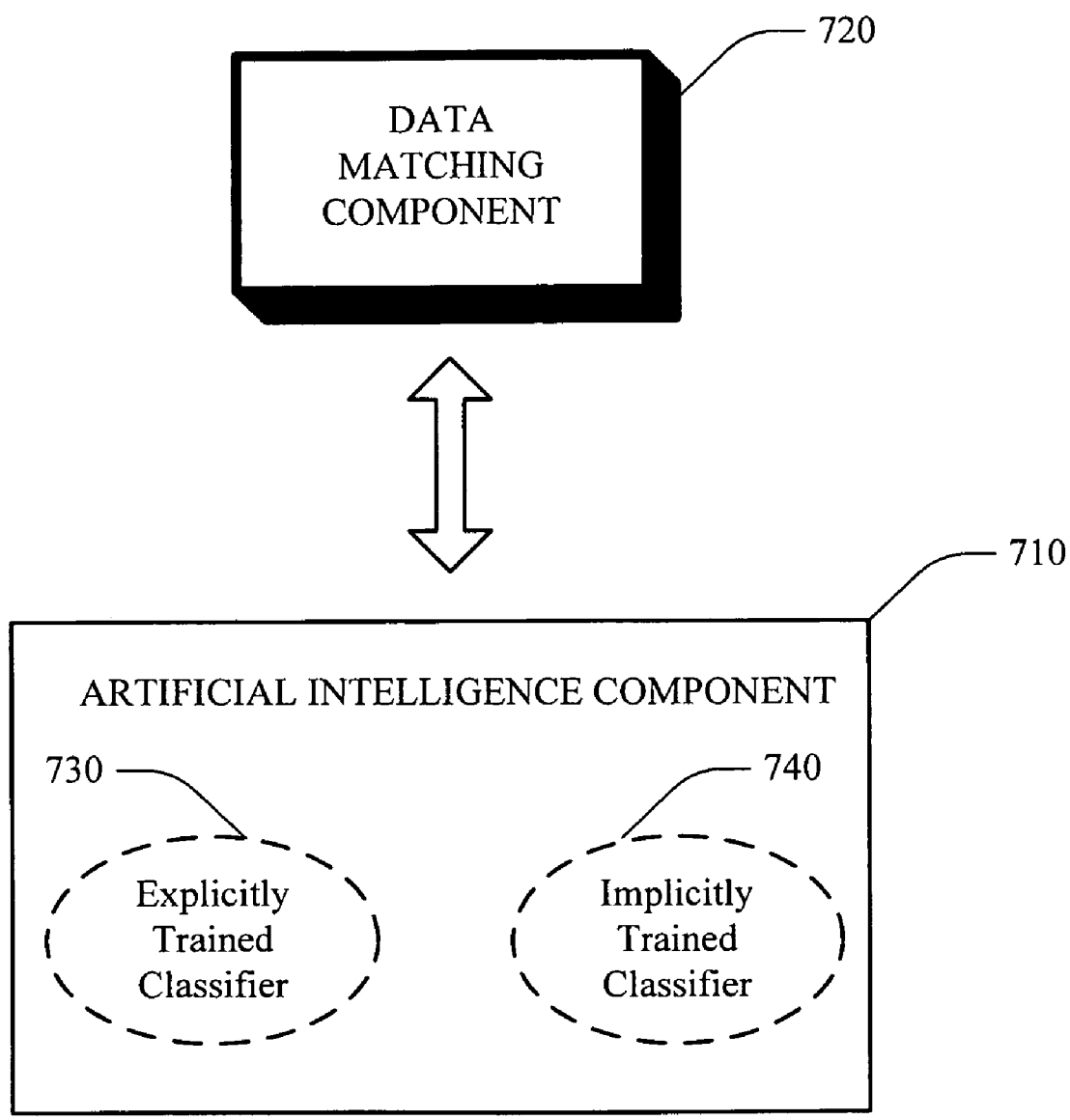
FIG. 7 illustrates a matching component that can implement various artificial intelligence components.

For example, a process for learning explicitly or implicitly when/how to curve fit a set of collected can be facilitated via an automatic classification system and process. Classification can employ a probabilistic and/or statistical-based analysis (e.g., factoring into the analysis utilities and costs) to prognose or infer an action that a user desires to be automatically performed. FIG. 7 illustrates such AI component 710 operatively connected to the matching component 720. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained 730 (e.g., via a generic training data) as well as implicitly trained 740 (e.g., via observing behavior of the industrial process, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)$=confidence(class).

Figure 8:
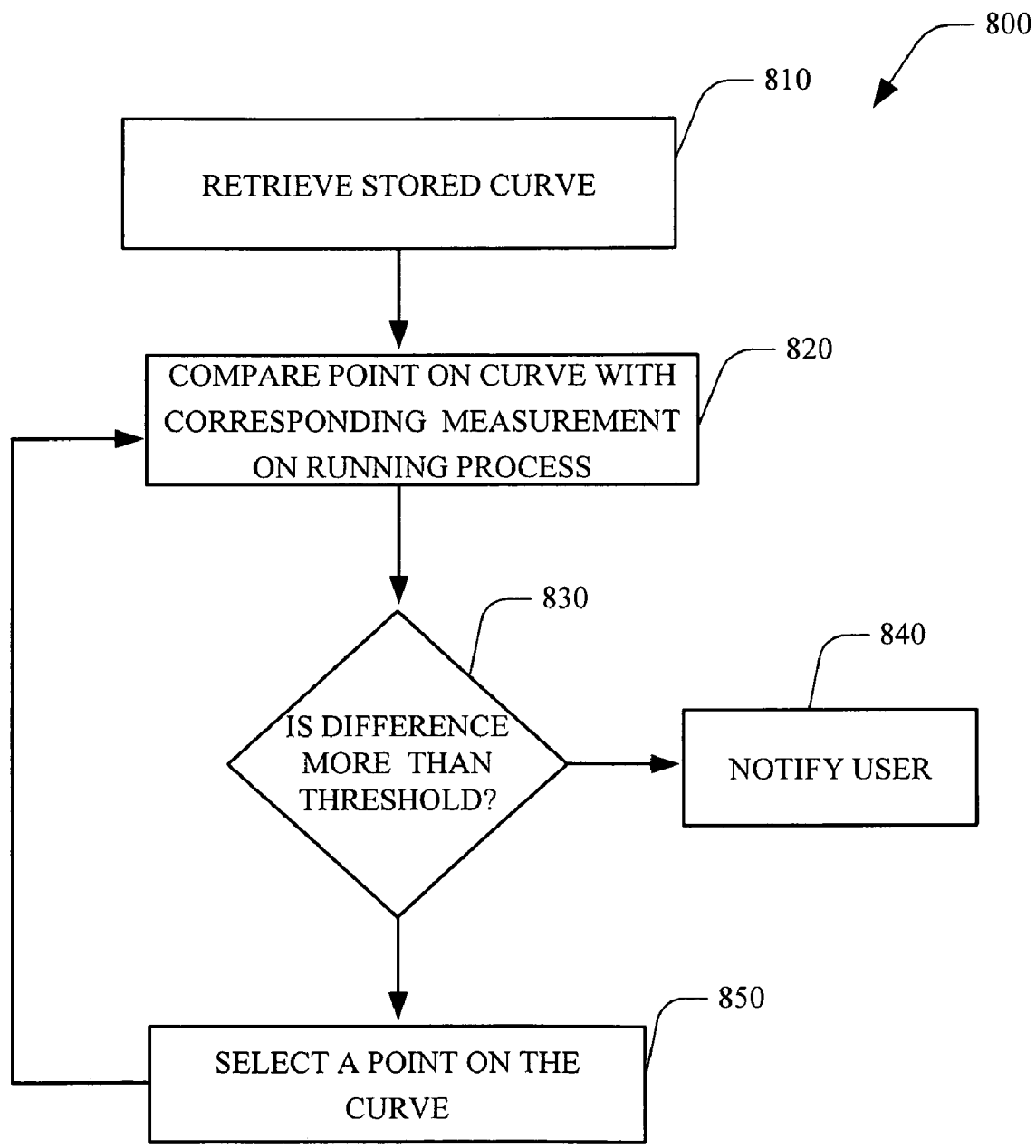
FIG. 8 illustrates a further methodology of controlling an industrial processes via a curve fitting.

FIG. 8 illustrates a methodology 800 of employing the fitted curve for a PLC control in accordance with an aspect of the subject innovation. Initially, and at 810 the stored curve—which has been created based on an earlier process and/or desired process—is retrieved. Subsequently, and at 820 a point on such curve can be compared to a corresponding measurement actually taken from the running process that control is desired thereon. A determination can then be made regarding a difference between the curve value and the measured value. If the difference (e.g., an absolute value) is more than a threshold, the methodology proceeds to 840, where the user and/or controller is notified (e.g., via audio or visual signals) to take corrective action, and adjust the industrial process. Otherwise, another point can be selected on the curve, and compared to a corresponding measurement on the running process.

Figure 9:
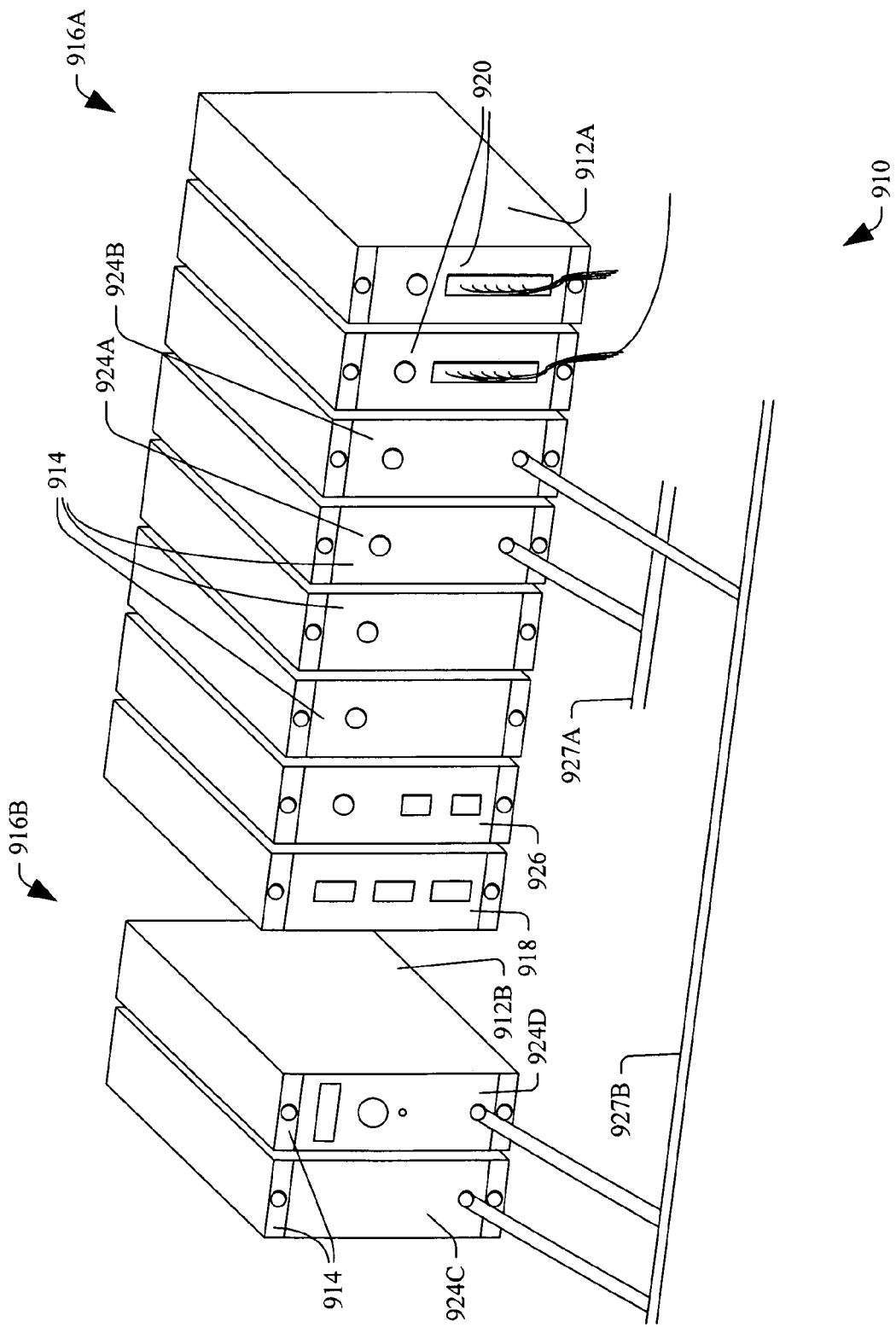
FIG. 9 illustrates an exemplary environment where various aspects of the subject innovation can be implemented.

The methods and systems of the subject innovation can be employed in association with many forms of control systems. In order to provide context for the various applications in which the aspects of the innovation may be carried out, an exemplary control system is now illustrated and described with respect to FIGS. 9 and 10. However, it will be appreciated that the various aspects of the innovation may be employed in association with controllers and control systems other than those illustrated and described herein. A distributed industrial control system 910 suitable for use with the subject innovation provides a first and second rack 912A and 912B for holding a number of functional modules 914 electrically interconnected by backplanes 916A and 916B running along the rear of the racks 912A and 912B respectively.

Each module 914 may be individually removed from the rack 912A or 912B thereby disconnecting it from its respective backplane 916 for repair or replacement and to allow custom configuration of the distributed system 910.

The modules 914 within the rack 912A may include, for example, a power supply module 918, a processor module 926, two communication modules 924A and 924B and two I/O modules 920. A power supply module 918 receives an external source of power (not shown) and provides regulated voltages to the other modules 914 by means of conductors on the backplane 916A. The I/O modules 920 provide an interface between inputs from, and outputs to external equipment (not shown) via cabling 922 attached to the I/O modules 920 at terminals on their front panels. The I/O modules 920 convert input signals on the cables 922 into digital words for transmission on the backplane 916A. The I/O modules 920 also convert other digital words from the backplane 916A to the necessary signal levels for control of equipment.

The communication modules 924A and 924B provide a similar interface between the backplane 916A and one of two external high speed communication networks 927A and 927B. The high speed communication networks 927A and 927B may connect with other modules 914 or with remote racks of I/O modules 920, controller configuration tools or systems, or the like. In the example illustrated in FIG. 9, the high speed communication network 927A connects with backplane 916A via the communication module 924A, whereas the high speed communication network 927B connects the communication module 924B with communication modules 924C and 924D in rack 912B. The processor module 926 processes information provided by the communication modules 924A and 924B and the I/O modules 920 according to a stored control program or routine, and provides output information to the communication module 924 and the I/O modules 920 in response to that stored program and received input messages.

Figure 10:
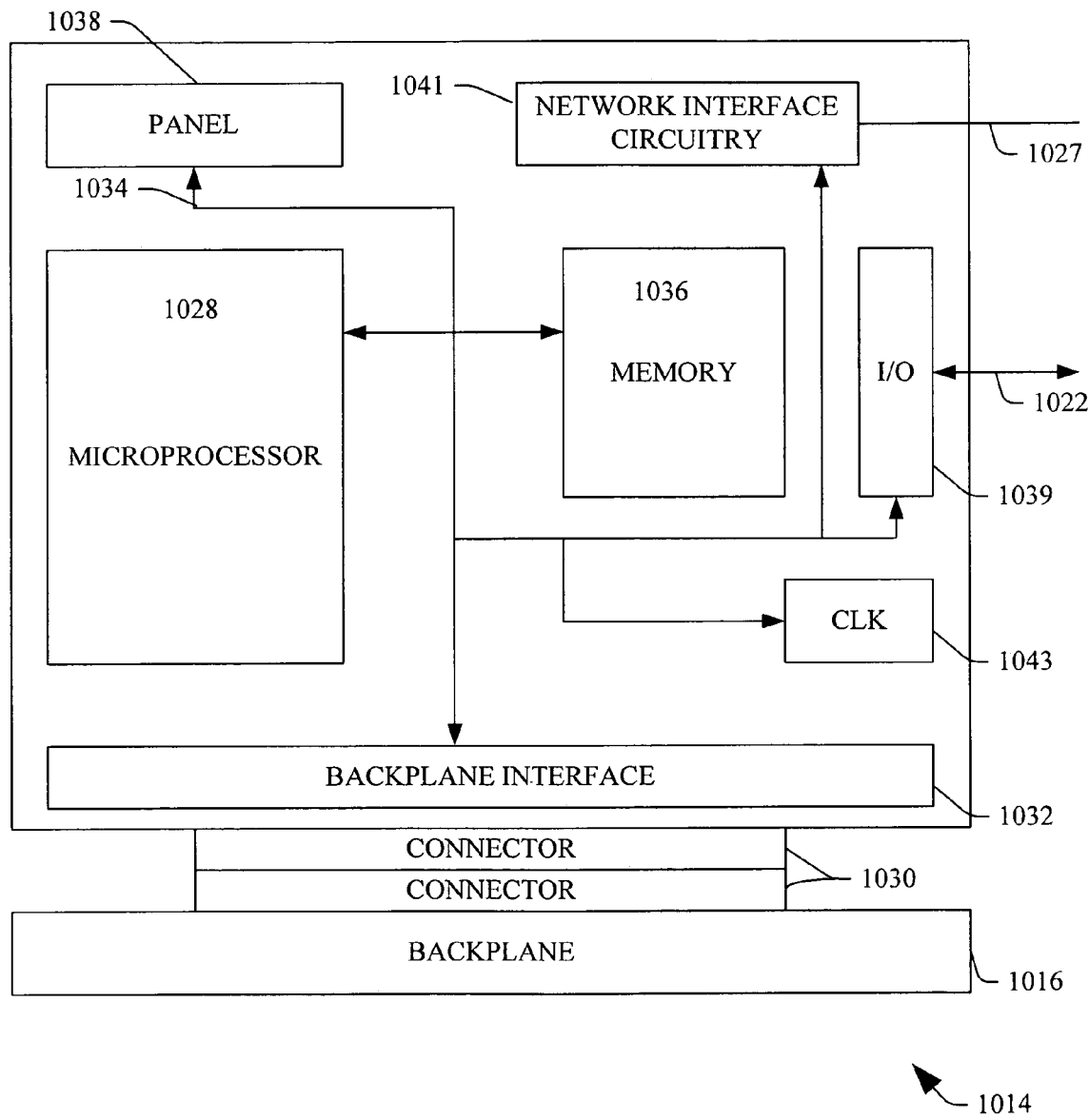
FIG. 10 illustrates a further exemplary environment wherein aspects of the innovation can be implemented.

Referring also to FIG. 10, each functional module 1014, is attached to the backplane 1016 by means of a separable electrical connector 1030 that permits the removal of the module 1014 from the backplane 1016 so that it may be replaced or repaired without disturbing the other modules 1014. The backplane 1016 provides the module 1014 with both power and a communication channel to the other modules 1014. Local communication with the other modules 1014 through the backplane 1016 is accomplished by means of a backplane interface 1032 which electrically connects the backplane 1016 through connector 1030. The backplane interface 1032 monitors messages on the backplane 1016 to identify those messages intended for the particular module 1014, based on a message address being part of the message and indicating the message destination. Messages received by the backplane interface 1032 are conveyed to an internal bus 1034 in the module 1014.

The internal bus 1034 joins the backplane interface 1032 with a memory 1036, a microprocessor 1028, front panel circuitry 1038, I/O interface circuitry 1039 (if the module is an I/O module 1020) and communication network interface circuitry 1041 (if the module is a communication module 1024). The microprocessor 1028 may be a general purpose microprocessor providing for the sequential execution of instructions included within the memory 1036 and the reading and writing of data to and from the memory 1036 and the other devices associated with the internal bus 1034. The microprocessor 1028 includes an internal clock circuit (not shown) providing the timing of the microprocessor 1028 but may also communicate with an external clock 1043 of improved precision. This clock 1043 may be a crystal controlled oscillator or other time standard including a radio link to an external time standard. The precision of the clock 1043 may be recorded in the memory 1036 as a quality factor. The panel circuitry 1038 includes status indication lights such as are well known in the art and manually operable switches such as for locking the module 1014 in the off state.

The memory 1036 may comprise control programs or routines executed by the microprocessor 1028 to provide control functions, as well as variables and data necessary for the execution of those programs or routines. For I/O modules 1020, the memory 1036 may also include an I/O table holding the current state of inputs and outputs received from and transmitted to the industrial controller 1010 via the I/O modules 1020. The module 1014 may be adapted to perform the various methodologies of the innovation, via hardware configuration techniques and/or by software programming techniques.

Although the innovation has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A programmable control system, comprising:
   a matching component that fits a pattern thru a plurality of data points that are gathered via a collection device associated with an industrial process;
   an artificial intelligence component that facilitates curve fitting comprising at least one of an implicit classifier or an explicit classifier; and
   a programmable logic controller that controls the industrial process via the pattern fitted thru the data points.

2. The programmable control system of claim 1, the matching component further comprising a Bezier curve fitting system that fits a Bezier curve thru the data points.

3. The programmable control system of claim 2, the matching component further comprising a graphical tool to interactively set deviations thresholds from a predetermined criteria.

4. The programmable control system of claim 3 further comprising a notification component that supplies a notification regarding a deviation from deviation thresholds.

5. The programmable control system of claim 4, the notification component includes an audio herald.

6. A method of identifying deviation of an industrial process comprising:
- collecting data from an industrial process to program a programmable logic controller,
- passing a curve thru collected data,
- employing an artificial intelligence component comprising employing one of an explicit classifier or an implicit classifier to facilitate data trending analysis;
- storing the curve to facilitate data trend analysis, and
- performing a data trending analysis via the curve.

7. The method of claim 6 further comprising discarding the collected data.

8. The method of claim 6 further comprising assigning a threshold value deviation from a desired operation for the industrial process.

9. The method of claim 6 further comprising computing a plurality of dependencies among data collected via the curve.

10. The method of claim 6, performing the data trending analysis act further comprising setting a threshold deviation to compare the running industrial process with a predetermined optimal performance.

11. The method of claim 10 further comprising changing parameters that control the industrial process to obtain desired performance and results.

12. The method of claim 10 further comprising notifying a user upon a deviation from the threshold deviation.

13. The method of claim 12 further comprising employing an audio herald.

14. The method of claim 6 further comprising excluding a data point from the collected data for curve fitting.

15. A programmable control system, comprising:
- means for fitting a Bezier curve thru a plurality of data points gathered via a collection device associated with an industrial process, said means comprising an artificial intelligence means that facilitates curve fitting comprising at least one of an implicit classifier or an explicit classifier;
- one or more means controlling the industrial process via the Bezier curve.

* * * * *